Dec. 15, 1959   D. L. KINGSTON ET AL   2,917,169
LAMP BULB FEEDER
Filed Aug. 22, 1955   7 Sheets-Sheet 1

Fig. 1

INVENTORS
DONALD L. KINGSTON
BURLEIGH H. LEACH
BY Lawrence Burns,
ATTORNEY

Fig. 3

INVENTORS
DONALD L. KINGSTON
BURLEIGH H. LEACH
BY Lawrence Burns,
ATTORNEY

Dec. 15, 1959     D. L. KINGSTON ET AL     2,917,169
LAMP BULB FEEDER Filed Aug. 22, 1955            7 Sheets-Sheet 6

INVENTORS
DONALD L. KINGSTON
BURLEIGH H. LEACH
BY
ATTORNEY

Dec. 15, 1959  D. L. KINGSTON ET AL  2,917,169
LAMP BULB FEEDER

Filed Aug. 22, 1955  7 Sheets-Sheet 7

INVENTORS
DONALD L. KINGSTON
BURLEIGH H. LEACH
BY
ATTORNEY

United States Patent Office 2,917,169
Patented Dec. 15, 1959

2,917,169

LAMP BULB FEEDER

Donald L. Kingston, Marblehead, and Burleigh H. Leach, Hamilton, Mass., assignors, by mesne assignments, to Sylvania Electric Products Inc., Wilmington, Del., a corporation of Delaware Application August 22, 1955, Serial No. 529,814

2 Claims. (Cl. 209—80)

This invention relates generally to automatic lamp making machinery and more particularly to apparatus for feeding glass envelopes or bulbs to mechanisms which deliver these bulbs to sealing or other machines in the process of manufacturing electric lamps.

The invention relates especially to the feeding of such bulbs having a restricted open neck terminating in a flared portion or cullet of greater diameter than the neck but smaller than the major diameter of the bulb.

One of the operations involved in the production of incandescent lamps is sealing a glass envelope or bulb over a sub-assembly of lamp parts called the "mount" and is performed on a sealing machine. Conventional sealing machines which have heretofore been available are adapted to performing something less than 1500 sealing operations per hour. Bulbs are deposited into these conventional machines one at a time either manually or by mechanical bulb loaders. When mechanical loaders have been used, they have been supplied with bulbs either manually or by bulb feeding conveyors. Such prior bulb feeding conveyors, however, have been adapted only to feeding particular sizes and shapes of bulbs and to operation at the relatively slow speeds required by conventional sealing machines.

When the bulbs are to be fed to sealing machines operating at higher speeds, several serious problems are encountered. One of these problems is that of maintaining a continuous flow of bulbs to the sealing machine, despite a random orientation of the bulbs in the reservoir from which they are fed. The bulbs have a tendency to interlock, thereby causing stoppage in the flow of bulbs.

In addition to such interlocking, another major problem in the design of bulb loading apparatus is the breakage of bulbs. As speed is increased in conventional bulb loaders, conditions of impact and crushing forces are increased to such a degree that the number of broken bulbs can reach unacceptably high proportions, especially when the more fragile sizes and shapes are being handled. The so-called A-19, A-21 and A-25 bulbs, for example, generally used in 60, 100 and 200 watt lamps, are among the most fragile used in lamp manufacture.

It is, therefore, an important object of our invention to provide apparatus capable of maintaining a continuous flow of bulbs to machines operating at high production rates. It is a further object of our invention to provide bulbs continuously from a single reservoir to two or more loading mechanisms requiring these bulbs. Such double loading is desirable in feeding a device such as shown in copending patent application Serial No. 516,212, filed June 17, 1955, now Patent No. 2,860,760, by Yeo and Maloney. A feature of the invention is a continuous and gentle agitation of bulbs in such a reservoir in order to relieve stoppages caused by interlocking of bulbs and to preserve the continuity of bulb feeding.

A further important object of our invention is to provide apparatus adapted to feed bulbs at high speeds with a minimum of breakage. A more particular object of our invention is a reduction in the impact and crushing forces to which bulbs are normally subjected in bulb feeding devices.

Still another object is preventing the feeding of broken bulbs to sealing machines. When such defective bulbs are loaded into the sealing machine undetected, imperfect lamps are produced, thereby wasting valuable mounts and machine productive capacity.

Another general object of our invention is the provision of apparatus capable of operation over prolonged periods with a minimum of attention from an operator.

It is a feature of our invention that a relatively wide belt which forms a substantial portion of the bottom of the bulb reservoir engages the bulbs by friction only to urge them therefrom.

It is an additional feature of our invention that the afore-mentioned belt rides on eccentric idlers which provide a gentle undulating motion to relieve bulb congestions from interlocking or other causes.

Another feature of our invention is a metering reel which cooperates with sensing devices to furnish two or more required quantities of bulbs.

Still another feature is the provision of air nozzles positioned to direct streams of air first to the neck of the bulbs and then to the enlarged portion as the bulbs are retained by the narrow portion of their necks, thereby ejecting bulbs having broken cullets.

Yet another feature is the provision of sensing switches which control alarm devices to summon an operator when the supply of bulbs at the bulb loader falls to an abnormally low level but before the flow of bulbs is interrupted.

Further objects and features of our invention will become apparent from a detailed description of a preferred embodiment thereof, with reference to the accompanying drawings, in which.

*General arrangement*

Figure 1:
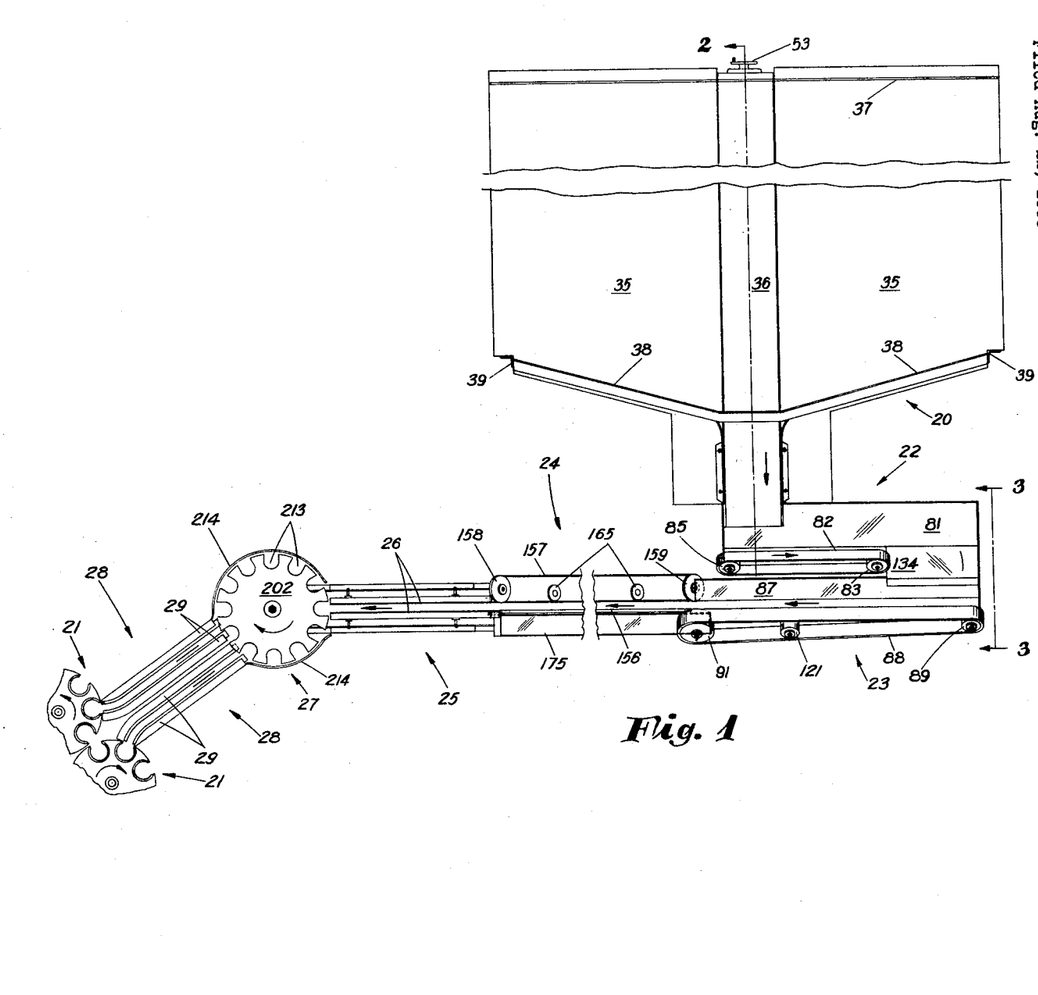
Figure 1 is a plan view of our apparatus.

The general arrangement of the preferred embodiment of our invention herein shown may be seen in Fig. 1 and includes a reservoir, generally called a hopper, indicated at 20 and at the extreme left a pair of bulb loader turrets indicated at 21. Below the hopper 20 in Figure 1 are an intermediate conveyor indicated at 22 and a bulb orienting conveyor indicated at 23. Adjacent to the conveyor 23, we have provided an elevator conveyor indicated at 24 inclined upwardly to the left toward a chute indicated at 25 and comprising a pair of guide rails 26 slanting downwardly from the upper end of the elevator conveyor 24. A metering device indicated at 27 is positioned adjacent a pair of chutes indicated at 28 and the lower end of the rails 26. Each chute 28 comprises a pair of guide rails 29 inclined downwardly from the metering device 27 to a bulb loader turret 21. These general elements are cooperatively associated in this preferred embodiment of our invention to accomplish its various objects. For purposes of clarity the following detailed description will proceed element by element along a general path followed by the bulbs.

The bulb reservoir

Figure 2:
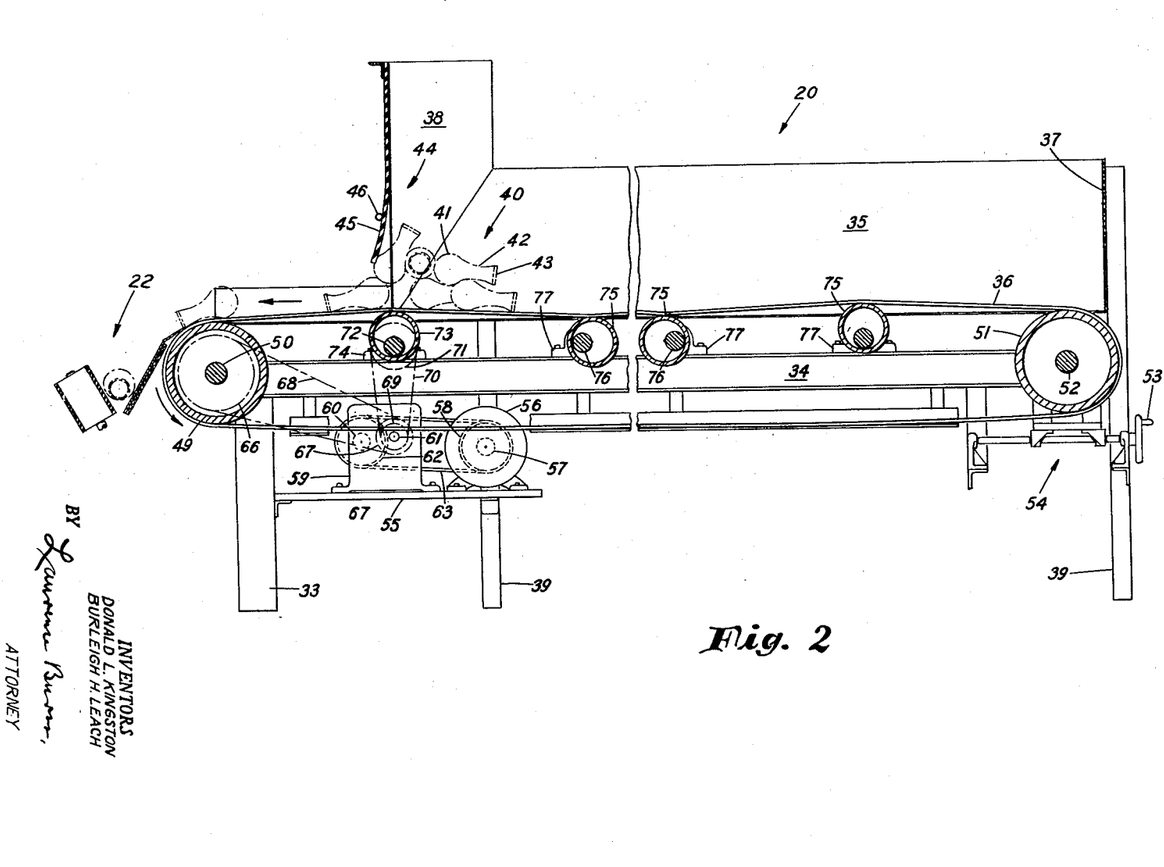
Figure 2 is a view of the reservoir or hopper forming a part of our apparatus taken along the line 2—2 of Fig. 1.

The hopper 20 and its associated drive mechanism will now be described in greater detail with particular reference to Figures 1 and 2. The hopper 20 comprises two side panels 35 inclined downwardly toward a belt 36 which forms the floor of the hopper 20, a vertically disposed rear end wall member 37 and a pair of vertical front wall sections 38 angularly disposed with respect to each other and to the path of the belt 36. The various wall sections 35, 37 and 38 are supported by a base weldment comprising legs 39, a pair of substantially parallel horizontal members 34 and a pair of upright support members 33, each supporting the forward end of a horizontal member 34. Into the hopper 20 are received quantities of bulbs indicated at 40 and each generally comprising an enlarged bowl portion 41 and an open neck 42 terminating in a cullet 43 having a diameter larger than the neck 42 but smaller than the bowl 41. At the front of the hopper 20, there is an opening indicated at 44, with a partial closure 45 of a suitable flexible material, such as rubber sheet, having sufficient stiffness to retain the bulbs 40 piled in the hopper 20 above the lower edge of the closure 45. A tension spring 46 is stretched transversely across the closure 45 above its lower edge between frame members to assist in resisting the outwardly directed load of the bulbs 40. The bulbs 40 are carried out of the hopper 20 by the upper surface of the belt 36 which is moved in a right to left direction (Fig. 2). Belt 36 is driven at a relatively slow speed by a driving drum 49 fixedly mounted on a shaft 50 which is journalled in a standard pillow block not shown and revolved in a counter-clockwise direction. At the rear of the hopper 20, the belt 36 is supported on an idler drum 51 journalled on a shaft 52, the latter being movable laterally by means of a hand-wheel 53 acting through a standard adjusting device indicated at 54 to regulate the tension of the belt 36. Driving components for the drum 49 are mounted on a plate 55 and include an electric motor 56, having a shaft 57 which carries a sheave 58, and a speed reducer 59, having an input shaft 60 and an output shaft 61. A sheave 62 is mounted on the input shaft 60 and coupled to the sheave 58 of the motor 56 by a V-belt 63. A sprocket 66 fixed to the shaft 50 is coupled to a drive sprocket 67 mounted on the output shaft 61 of the speed reducer 59 by means of a roller chain 68.

A second drive sprocket 69 fast on the shaft 61 is coupled by a chain 70 to a driven sprocket 71 fixedly mounted on a shaft 72. A roll 73 is eccentrically fixed to the shaft 72 which is journalled for rotation in a pair of pillow blocks 74 each mounted on a structural member 34. (Alternatively the roll 73 may be journalled on a crank pin, replacing the shaft 72 and driven eccentrically relative to the axis of the sprocket 71.) The eccentric rotation of the roll 73 produces an undulating motion of the belt 36 at the opening 44 which eliminates congestions of interlocked bulbs at this point. In addition, idler rolls 75 are provided at substantially equal intervals along the length of the belt 36. Each roll 75 is mounted to rotate eccentrically with a shaft 76 journalled in a pair of pillow blocks 77, each supported on a horizontal member 34.

Intermediate and orienting conveyors

The bulbs 40 are generally carried from the hopper 20 randomly oriented by the belt 36 at irregular intervals and often in groups of several at one time. It is necessary that the bulbs 40 be arranged in a single file and oriented vertically in neck-down position for transfer to the elevator conveyor 24. These functions are accomplished by the intermediate conveyor 22 and the bulb orienting conveyor 23 which will now be described in detail with particular reference to Figures 1, 3 and 4. The intermediate conveyor 22 comprises an inclined wall member 81 and an adjacent endless belt 82 longitudinally parallel to the member 81 and inclined in a transverse plane toward the lower edge of the member 81. The belt 82 is driven at its right end by a pulley 83 fixed to a rotatable drive shaft 84 and passes over an idler 85, fixed to a rotatably mounted idler shaft 86. Similarly the bulb orienting conveyor 23 includes a slanted wall member 87 and an endless belt 88 longitudinally parallel to and transversely convergent toward the lower edge of the member 87. The adjacent edges of the belt 88 and the member 87 are spaced apart sufficiently to allow bulb cullets 43 to drop between them and the bulbs 40 to be supported on the orienting conveyor 23 by their bowl portions 41. The belt 88 is driven at its right end by a pulley 89 fast on a drive shaft 90 and is provided at the opposite end with an idler 91 journaled on a fixed shaft 92.

Active components of the conveyors 22 and 23 are supported on a frame weldment which includes substantially horizontal angle iron rails 95, 96 and 97 linked together near their right and left ends by cross bars 98 and 99 respectively. The cross bar 98 overlies and is rigidly connected to the rails 95, 96 and 97, supported at the right end by a pair of structural components 100 which extend downwardly to a base plate 101. To provide an unobstructed path for the depending cullets 43 of the bulbs 40 being carried by the orienting conveyor 23 we have placed the cross bar 99 below the rails 95, 96 and 97 (Fig. 3) and we have provided three shorter supporting bars 102, affixed to the cross bar 99 and rigidly connected, one to each of the rails 95, 96 and 97. A bracket 107 is affixed at one end to a plate 103 extending between the upright support members 33 of the hopper 20 and is joined to the cross bar 99 by a pair of screws 104. In addition to the bracket 102 a pair of legs 105 are provided at the front of the framework and a leg 106 supports the upper end of the base plate 101.

We will now describe in greater detail the mounting of the active components of the conveyors 22 and 23 upon this framework. The drive shaft 84 of the belt 82 is journalled in a sleeve 110 (Fig. 3) having a pair of integral ears 111 fixed to the rails 95 and 96 by screws 112. The shaft 86, upon which the idler 85 is fixed, is rotatably mounted in a bracket 113 (Fig. 3) similar to but shorter than the sleeve 110, extending downwardly to the upper surface of the rails 95 and 96 only. The bracket 113 has an integral foot 114 and is positioned longitudinally to adjust the belt 82 to the required degree of tension by screws 115 passing through elongated slots 116. The drive shaft for the belt 88 is journalled in a housing 117 integral with the cross bar 98. The shaft 92, upon which the idler 91 is journalled, is fixedly mounted in a bracket 118 having an offset foot 119 fixed to the rail 97 by a pair of screws 120. An adjustable tension pulley 121, omitted from Fig. 3 for clarity, is fast on a shaft 122 rotatably mounted in a bracket 123 (Fig. 4) having a pair of slots 124 which permit the pulley 121 to be adjustably positioned on the rail 97 by screws 127 to regulate tension on the belt 88.

To maintain the required longitudinal parallelism between the belts 82 and 88 and their corresponding wall members 81 and 87, we have provided back boards 128 and 129 (Fig. 4) which are in contact with substantially the whole width of the belts 82 and 88 respectively. The back board 128 is supported on the rail 95 by brackets 130 and extends a major part of the free length of the belt 82 intermediate the pulley 83 and the idler 85. The back board 129 is similarly extensive with respect to the belt 88 and is supported on brackets 131 mounted on the rail 97. Face boards 132 and 133 (seen in Fig. 3) placed above the belts 82 and 88 extend practically the whole length of their respective belts and prevent an overflowing of bulbs during pile-ups which occur from time to time. The face boards 132 and 133 are also supported on the brackets 130 and 131 respectively. Other stationary components which are supported on the rails 95 and 96 include the wall member 81 fixedly mounted on brackets 125 and member 87 fast on brackets 126 which provide adjustment in the spacing between the belt 88 and the wall member 87 to accommodate bulbs of different sizes. To the right of the drive pulley 83 in Fig. 1, a ramp 134 over which bulbs transfer from the conveyor 22 to the conveyor 23 is supported on the rail 95 by brackets 135 shown in Fig. 3.

Figure 3:
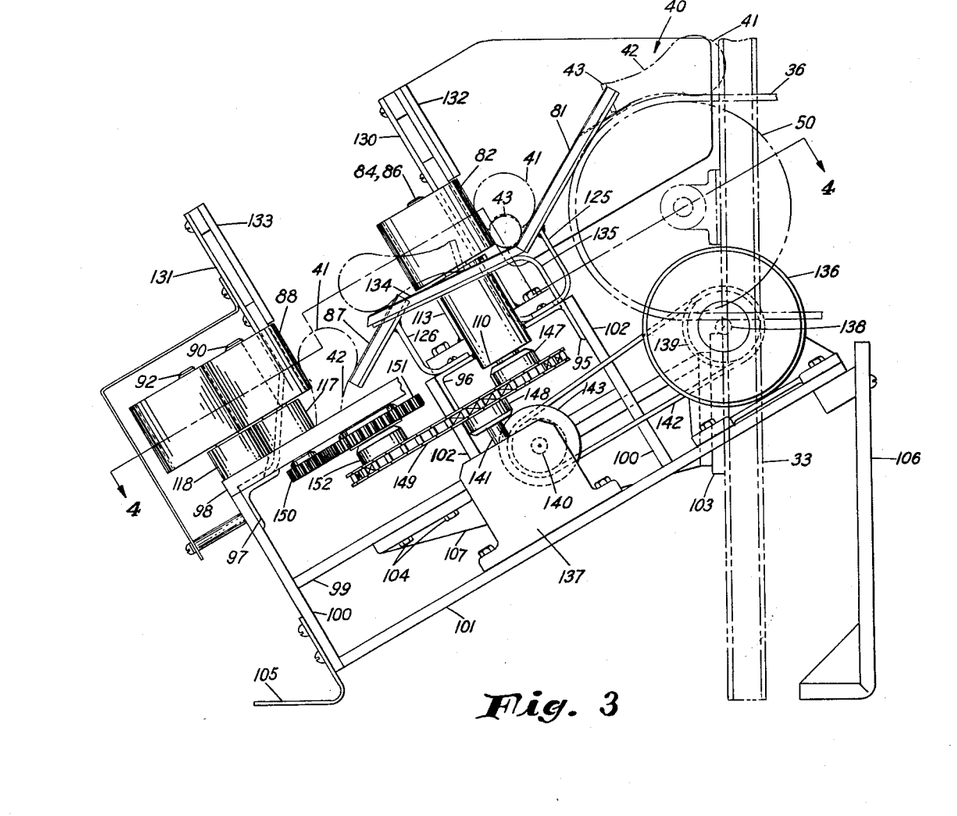
Figure 3 is an end view taken from line 3—3 in Fig. 1 and showing an intermediate bulb conveyor and a bulb orienting conveyor incorporated in our apparatus.
Figure 4:
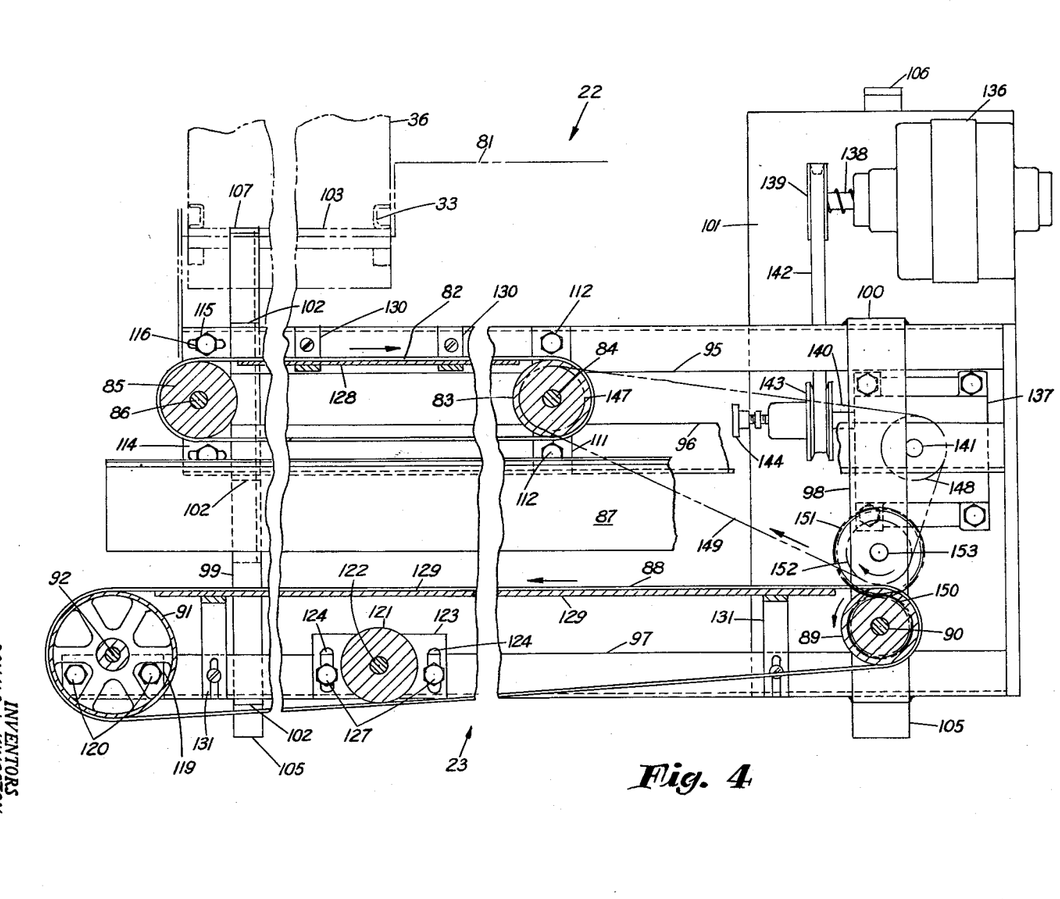
Figure 4 is a view partly in cross-section taken along the line 4—4 of Fig. 3.

We will now describe in greater detail the drive components for the belts 82 and 88 including an electric motor 136 and a speed reducer 137 both mounted on the base plate 101 and seen in Figures 3 and 4. The motor 136 has a shaft 138 which carries a drive sheave 139 and the speed reducer 137 is provided with an input shaft 140 and an output shaft 141. A V-belt 142 passes over the drive sheave 139 and a driven sheave 143 mounted on the input shaft 140. The sheaves 139 and 143 are of a common variable pitch type adjustable by means of a hand knob 144 to change relative speeds of the shafts 138 and 140. A driving connection between the shaft 84 and the output shaft 141 includes a sprocket 147 fixed to the shaft 84, a sprocket 148 carried by the output shaft 141 and a roller chain 149 in engagement with the sprockets 147 and 148. On the other hand the shaft 90 is driven through an arrangement comprising a pinion 150 fixed to the shaft 90, a gear 151 fast on a sprocket 152 with which it is journalled on an intermediate shaft 153 (Fig. 4). The gear 151 is in mesh with the pinion 150 and the sprocket 152 is in engagement with the chain 149 to rotate the shaft 90 and the pulley 89 of the belt 88 in a counter clockwise direction.

*Elevator conveyor*

Figure 6:
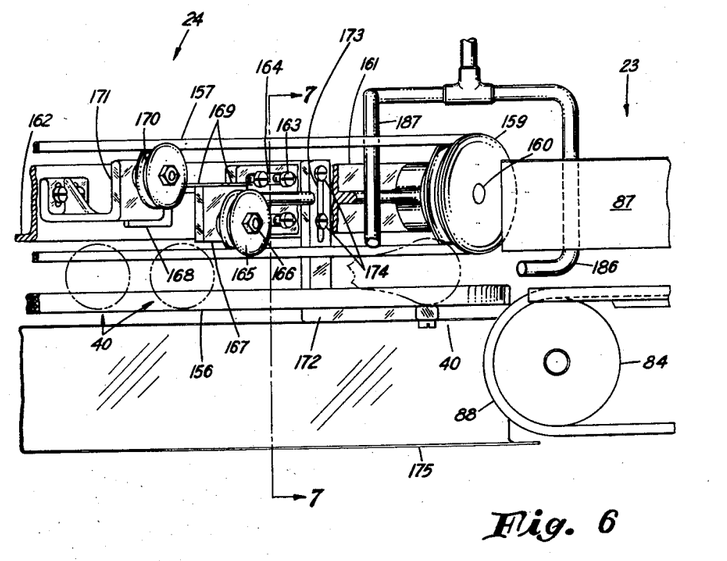
Figure 6 is a detail plan view of the lower end of our bulb elevator conveyor and the delivery end of the bulb orienting conveyor.
Figure 7:
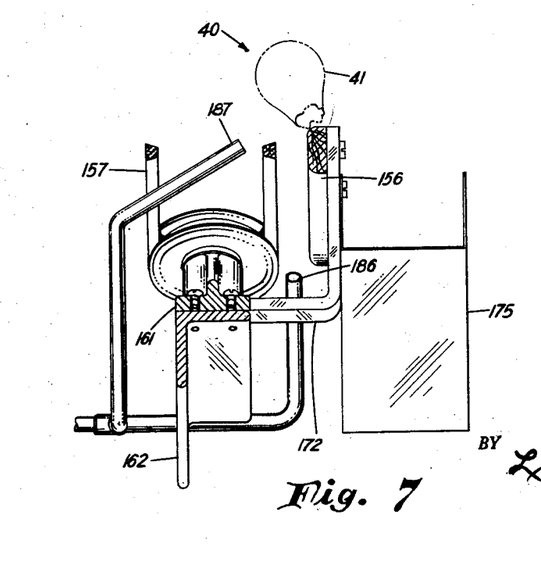
Figure 7 is a view, partially in cross section taken along the line 7—7 of Fig. 6 and showing air nozzles which we employ to eject bulbs having broken cullets from the elevator conveyor.

The bulb orienting conveyor 23 described above is adapted to delivering bulbs arranged vertically in neck-down position at somewhat irregular intervals. The chute 25 has therefore been provided to serve as a reservoir for a small quantity of bulbs to assure continuity of delivery by gravity to the metering device 27. To transport bulbs from the orienting conveyor 23 to the chute 25 we employ an elevator conveyor 24 which will now be more fully described with reference to Figures 1, 5, 6, and 7. The bulbs 40 are carried upwardly on the elevator conveyor 24 by engagement of their neck portion 42 between a stationary guide rail 156 and a moving V-belt 157 having a bulb driving surface disposed substantially parallel to the rail 156. The V-belt 157 is mounted over a drive sheave 158 at its upper end and an idler 159 at its lower end adjacent the orienting conveyor 23. The idler 159 is fixed upon a shaft 160 which is journalled in a bracket 161. Tension on the V-belt 157 is adjusted by varying the lengthwise positioning of the bracket 161 which is retained on an angle iron girder 162 by screws 163 through elongated slots 164. The driving side of the V-belt 157 adjacent the guide rail 156 passes over several spring-loaded tension sheaves 165 (Fig. 6) each rotatably mounted on a stud 166 fixed to a shelf 167 which is in turn supported on a base 168 by a pair of leaf spring elements 169. Each base 168 is transversely adjustable on the girder 162 to vary the bulb driving pressure applied to the necks 42 of the bulbs 40. On its non-driving side, remote from the guide rail 156, the V-belt 157 passes over a pair of rigidly supported idlers 170, one of which is shown in Figure 6. Each idler 170 is rotatably mounted on a rigid base 171 which is also transversely adjustable on the girder 162 to maintain contact between the idler 170 and the V-belt 157. The guide rail 156 is supported on brackets 172, one of which is shown in Figs. 6 and 7, mounted on the girder 162 and each provided with an elongated slot 173 and a pair of screws 174 which permit changes in spacing between the guide rail 156 and the bulb driving surface of the V-belt 157 to accommodate bulbs 40 having necks 42 of different diameters. In addition an inclined tray 175 adjacent the guide rail 156 is affixed to the brackets 172 to receive bulbs 40 which have been ejected from the elevator conveyor 24 as will be explained below and the girder 162 is adjustably supported near its lower end on a foot 176 shown in Fig. 5.

Figures 5, 10:
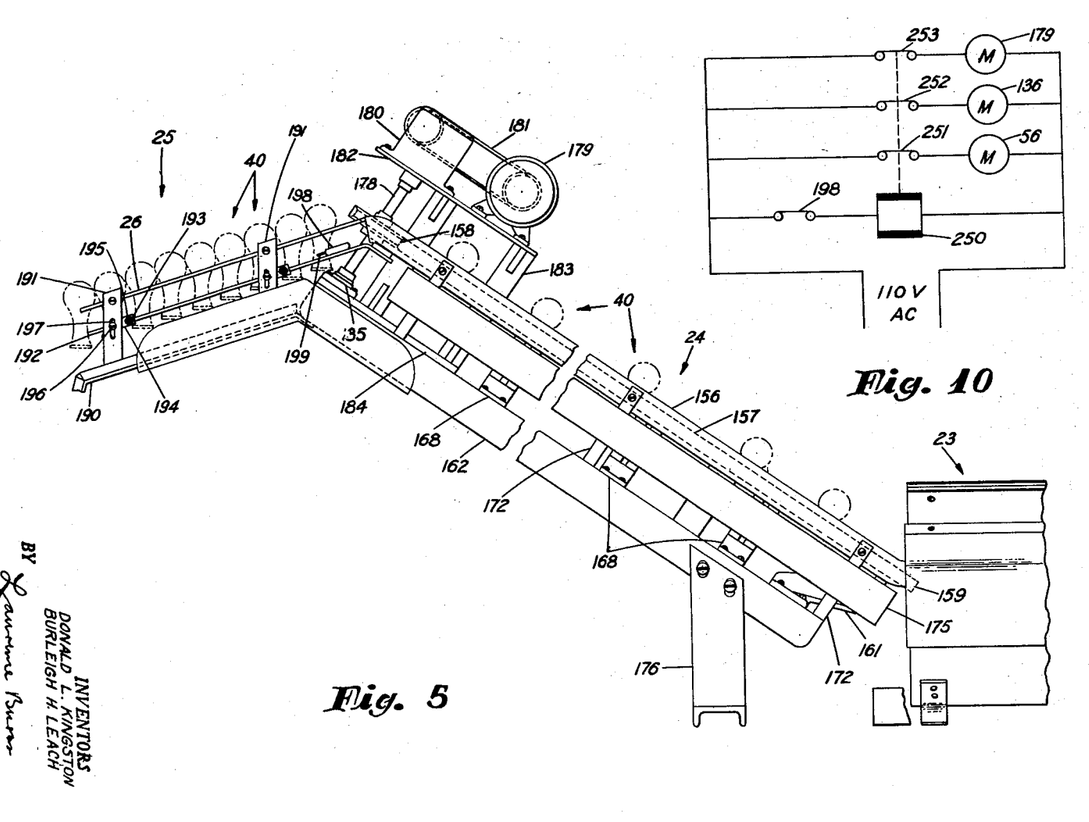
Figure 5 is a view in side elevation of a portion of our apparatus showing the delivery end of the bulb orienting conveyor and the bulb elevator conveyor.
Fig. 10 is a schematic circuit diagram of the controls for regulating the flow of bulbs to the chute.

Motive power is supplied to the V-belt 157 by a driving arrangement shown in Fig. 5 and comprising an electric moor 179 coupled to a speed reducer 180 by a V-belt 181. The motor 179 and the speed reducer 180 are mounted on a shelf 182 supported on a structure including columns 183 upstanding on a base plate 184 which is fixed to the girder 162. The speed reducer 180 has an output shaft 178 which carries the drive sheave 158 for the V-belt 157 and is journalled at its lower end in a bearing block 185 fixed to the base plate 184.

*Rejection of defective bulbs*

Since it is undesirable to feed to a sealing machine bulbs whose cullets have been broken off, we have incorporated at the lower end of the elevator conveyor 24 a device (shown in Figs. 6 and 7) for ejecting such bulbs comprising nozzles 186 and 187 in communication with a suitable source of air under pressure not shown. The nozzle 186 is placed intermediate the guide rail 156 and the driving surface of the V-belt 157 at a sufficient distance below to clear the cullets 43 of unbroken bulbs 40. An air jet is directed by the nozzle 186 to the neck 42 of each passing bulb 40 urging the neck 42 to swing forwardly of the bowl 41 in the direction of travel. Normally the extent of this forward swing is limited by the cullet 43 which presents an obstruction to total disengagement of the bulb 40 from the guide 156 and the V-belt 157. However, if the cullet 43 has been broken off before reaching this point, the thrust imparted to the neck 42 by the jet of air from the nozzle 186 is sufficient to disengage completely the neck 42 from the guide rail 156 and the V-belt 157. In this disengaged position the defective bulb 40 may be carried a short distance atop the V-belt 157 and rail 156 as shown in Fig. 6 until the nozzle 187 is reached. The nozzle 187 directs a stream of air to the bowl 41 of each passing bulb 40. This stream of air propels defective bulbs without cullets to the right as shown in Fig. 7 into the tray 175.

*Bulb metering*

Figures 8, 9:
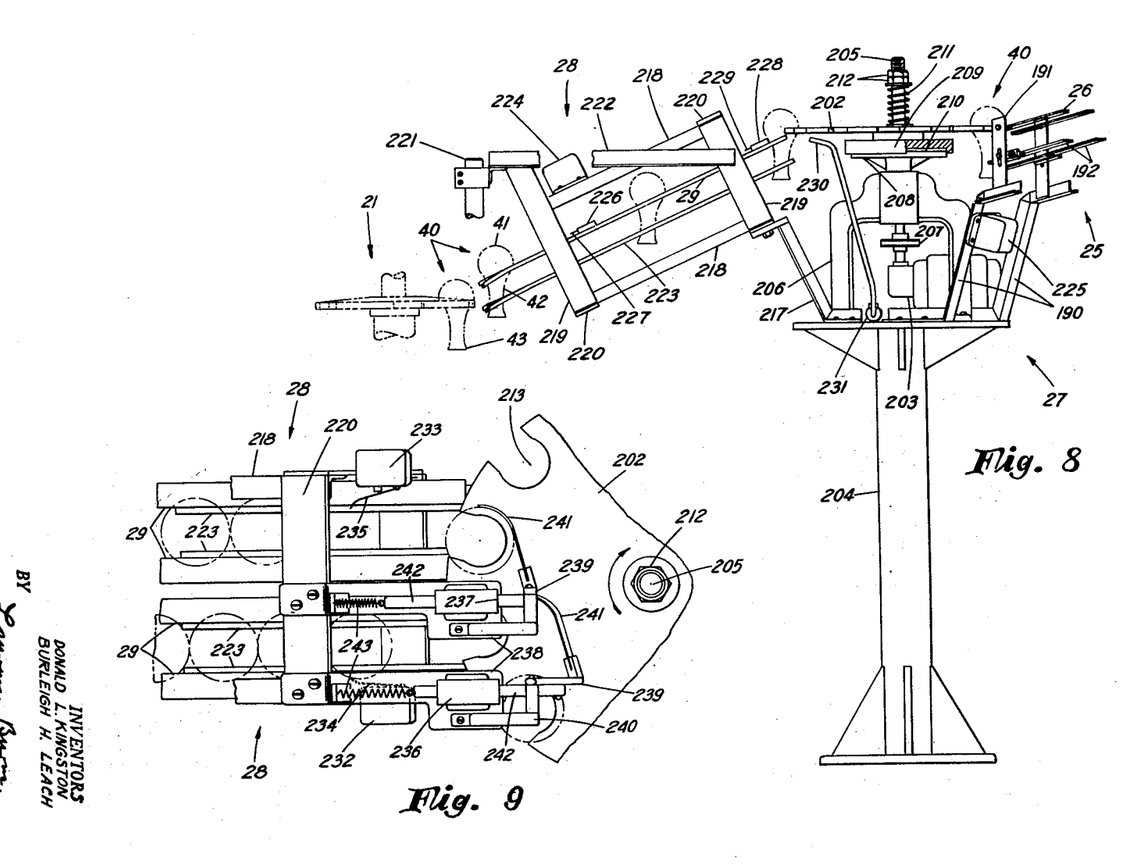
Fig. 8 is a view in side elevation of a metering turret and a pair of bulb chutes which are a part of our apparatus.
Fig. 9 is a fragmentary plan view of the metering turret and associated chutes showing an alternative mechanism employed to deliver bulbs from the turret to the chutes.

At the top of the elevator conveyor 24, the bulbs 40 are transferred to the chute 25, shown in Fig. 5 and fragmentarily in Fig. 8, which delivers the bulbs 40 by gravity to the metering device 27. In addition to the top bulb rails 26, the chute 25 comprises a supporting framework including a pair of angle iron structural members 190 and upright supports 191 upon which the top rails 26 and a pair of parallel neck rails 192 are adjustably mounted. The top rails 26 are placed in parallel relationship spaced apart a distance less than the diameter of the bowls 41 which are supported on the rails 26. The necks 42 are retained between the rails 192 each adjustably fixed to the upright supports 191 by an arrangement comprising at each support 191 a stud 193 rigidly connected to the rail 192 as by welding and retained in a block 194 by a pair of opposed check nuts 195. A screw 196 passing through an elongated slot 197 is employed to fasten each block 194 to its respective support 191. By this arrangement the spacing between the rails 192 and their elevation may be varied to accommodate bulbs of different sizes and shapes on the chute 25.

Each bulb 40 is retained on the chute 25 by the rails 192 which engage the neck 42 above the cullet 43 and are spaced apart a distance shorter than the cullet diameter. The rails 192 extend beneath the upper end of the guide rail 156 and the V-belt 157 of the elevator conveyor 24 to engage the necks 42 of the bulbs 40 before they are released from the elevator conveyor 24. The top rails 26 on the other hand abut the V-belt 157 and the guide rail 156 to receive thereon the bowls 41. A supply of bulbs 40 vertically arranged in neck down position is maintained on the chute 25 feeding by gravity toward the metering device 27.

To regulate the flow of bulbs to the chute 25 we employ a switch 198 having an actuating lever 199 and mounted on one of the rails 192. The switch 198 is operated to shut off the flow of bulbs to the chute 25 as will be explained below, when its actuating lever 199 is in contact with one of the bulbs.

The metering device 27 shown in Figs. 8 and 9 is positioned adjacent the chute 25 and includes a turret 202 rotated by a motor drive 203 and supported on a pedestal 204. The drive 203 is connected to a shaft 205, journalled in a yoke 206, by a flexible coupling 207. The yoke 206 and the motor drive 203 are fixed upon the upper surface of the pedestal 204 which also supports the structural members 190 of the chute 25. The turret 202 is rotated by the shaft 205 through a frictional coupling including a drive plate 208 fast on the shaft 205, a driven plate 209 fixed to the turret 202 and free to rotate on the shaft 205 with the turret 202, and a friction disk 210 between the plates 208 and 209. A compression spring 211 encircling the shaft 205 and backed by a pair of pressure adjusting nuts 212 urges the plate 209 into driving engagement with the disk 210. This frictional coupling between the turret 202 and its motor drive 203 prevents damage to the equipment in the event that an object such as a piece of glass becomes wedged between the rails 26 and the turret 202, for example. If such a jam occurs, slippage of the frictional coupling permits the turret 202 to stop rotating until the jam is cleared by an operator.

The turret 202 is provided at its periphery with a plurality of slots 213 shown in Figs. 1 and 9 and each adapted to carrying a bulb received by gravity feed from the chute 25. Retainers 214, shown in Fig. 1 and suitably supported on the pedestal 204 encircle the turret 202 to prevent the ejection of the bulbs 40 by the rotary motion of the turret 202. The bulbs 40 are transferred, as will be explained below, from the turret 202 to one of the chutes 28 which deliver bulbs by gravity to the turrets 21.

The chutes 28 will now be more fully described with particular reference to Figs. 1, 8 and 9. Two chutes 28, one leading to each turret 21 are mounted on a common framework which includes a pair of leg members 217 supported on the pedestal 204, longitudinal members 218, uprights 219 and cross bars 220 all rigidly interconnected as by welding. Additional support for this framework is provided by a pair of posts 221 shown in Fig. 8 exending down to the floor and joined to the framework by a pair of guys 222. Besides a pair of upper rails 29 which support the bulbs 40 by their bowls 41, each chute 28 includes a second pair of rails 223 generally parallel to each other and to the rails 29. In each chute 28 the rails 29 and 223 are fully adjustable vertically and in spacing to accommodate bulbs of various sizes and shapes in a manner not shown but similar to that provided for the rails 26 and 192 of the chute 25. On each chute 28 the bulbs 40 are confined by the lower rails 223 spaced apart a distance greater than the diameter of the neck 42 but less than that of the cullet 43. Thus a supply of bulbs 40 is maintained on each chute 28 feeding by gravity to the associated bulb loader turret 21 fully described in U.S. patent application Serial No. 516,212, filed June 17, 1955. An electric vibrator 224 is mounted on one of the upper lonigtudinal members 218 to assist gravity in maintaining the flow of bulbs on the chutes 28. A similar vibrator 225 fixed to one of the structural members 190 performs the same function on the chute 25. A switch 226 having an operating lever 227 and fixed to one of the rails 29 of each chute 28 is connected in series with a warning device such as an electric bell or buzzer to sound an alarm when the supply of bulbs 40 is insufficient to maintain contact with the operating lever 227. The operator is thereby summoned before an interruption in bulb feeding occurs so that the responsible condition may be corrected.

Near the upper end of each chute 28, a switch 228 having an actuating lever 229 is mounted on one of the rails 29.

Each switch 228 regulates the transfer of bulbs to its associated chute 28 from the turret 202 as will now be explained with reference to Fig. 8. Positioned in alignment with each chute 28 and beneath the turret 202 is an air nozzle 230 connected to a source of air under pressure through a solenoid operated valve 231. The switch 228 is connected in series with the valve operating solenoid across a source of electrical potential. Thus, for example, the switch 228 may be of the normally closed variety and the valve 231 also normally closed. With this arrangement, when no bulbs are in contact with the switch actuating lever 229, the switch is closed, the solenoid is energized opening the valve 231 and a stream of air is directed by the nozzle 230 to the bulbs 40 being carried by the turret 202 urging them on to the related chute 28. When a sufficient supply of bulbs 40 has accumulated on the chute 28, bulbs 40 contact the actuating lever 229 opening the switch 228, de-energizing the solenoid thereby closing the valve 231 so that the stream of air from the nozzle 230 is cut off and the transfer of bulbs 40 to the paritcular chute 28 is interrupted.

An alternative device which has also been employed for transferring bulbs 40 from the turret 202 to the chutes 28 is shown in Fig. 9 and will now be described. Normally open switches 232 and 233 mounted on a rail 29 of the lower and upper chutes 28 respectively are provided for regulating the flow of bulbs 40 to the chutes 28. The switch 232, having an actuating lever 234, is connected in series with a solenoid 236 across a source of electrical potential to control the transfer of bulbs to the lower chute 28 while the switch 233 provided with an actuating lever 235 is similarly in series with a solenoid 237 to regulate the flow of bulbs to the upper chute 28. Each of the solenoids 236 and 237 is fixed upon a supporting plate 238 and is operatively connected to a generally vertical lever 239 pivoted at its upper end on a bracket 240 and bearing a guide member 241 at its lower end. The guide members 241 are movable between bulb feeding and retracted positions shown at the upper and lower chutes 28 respectively. Motion of the guides 241 between the two positions is effected by armatures 242 of the solenoids 236 and 237 each armature 242 being pivotally connected to its respective lever 239 and urged outwardly from the center of the turret 202 by a spring 243 held under tension between a suitable fixed frame member and the armature 242. On the upper chute 28 the supply of bulbs is insufficient as shown to reach the actuating lever 235 and the switch 233 is therefore in its normally open position. The solenoid 237 in series with the switch 233 is de-energized and its armature 242 is pulled back by the spring 243 thereby placing the guide member 241 in its bulb feeding position. On the other hand, at the lower chute 28 the supply of bulbs 40 as shown is sufficient to reach the actuating lever 234 thereby closing the switch 232. The solenoid 236 in series with the switch 232 is therefore energized, its armature 242 is extended against the tension of its spring 243 and the associated guide member 241 is in its retracted position.

It will be appreciated by the reader that either of the above described devices for transferring bulbs to the chutes 28 from the turret 202 alternates in feeding bulbs first to one and then to the other chute 28. Since the turret 202 is rotated in a clockwise direction as seen in Fig. 9, the lower chute 28 is first to be supplied in the event that bulbs are required by both chutes 28 simultaneously. After a brief interval the requirements of the lower chute 28 are fulfilled since the turret 202 is operated at a sufficient speed to carry past the chutes 28 a quantity of bulbs in excess of their combined requirements. When bulbs are no longer required by the lower chute 28 the bulbs 40 carried by the turret 202 are available for transfer to the upper chute 28. When a sufficient quantity of bulbs is present on each of the chutes 28, the bulbs 40 remain on the turret 202 being carried past the delivery end of the chute 25. Since each of the slots 213 on the turret 202 is adapted to supporting a single bulb, the slots 213 carrying bulbs 40 not required by the chutes 28 are moved past the chute 25 without picking up bulbs.

*Regulating switch*

We will now describe with reference to Figures 1, 5, and 10 the function of the switch 198, shown in Fig. 5, which we have provided to regulate the flow of bulbs to the chute 25. The switch 198 which is normally closed is connected in series with a solenoid 250, shown schematically in Fig. 10, across a source of electrical potential such as a 110 volt A.C. line. The solenoid 250 operates switches 251, 252 and 253 each forming a series circuit across the 110 volt A.C. source with one of the motors 56, 136 and 179 respectively. When the supply of bulbs on the chute 25 is insufficient to reach the actuating lever 199, the switch 198 is in its normally closed position, solenoid 250 is energized closing switches 251, 252 and 253 thereby rendering the motors 56, 136 and 179 operative by connecting them to the power source. The motors 56, 136 and 179 drive the belt 36, the intermediate conveyor 22, the bulb orienting conveyor 23 and the elevator conveyor 24 shown in Fig. 1, bringing a supply of bulbs to the chute 25.

When the number of bulbs on the chute 25 is sufficient, the switch 198 is opened by contact of one of the bulbs with the actuating lever 199, solenoid 250 is de-energized opening the switches 251, 252 and 253, thereby shutting off the motors 56, 136 and 179 and suspending the feeding of bulbs to the chute 25. The switches 251, 252 and 253 preferably operate after a brief time delay somewhat greater than the period required for a bulb to pass the actuating lever 199, so that the motion of the conveyors will not be interrupted each time a bulb contacts the lever 199 on its way down the chute 25. By appropriate adjustments in the operating speeds of the belt 36 and the conveyors 22, 23 and 24 an adequate supply of bulbs is maintained on the chute 25. On the other hand the regulation provided by the switch 198 prevents an excessive accumulation of bulbs on the chute 25.

Having now described the various components of our apparatus we will proceed with an operational summary having particular reference to Fig. 1. The bulbs 40 which are delivered to the hopper 20 in lots of several hundred at one time are carried forward to the intermediate conveyor 22 by the action of the belt 36. Arriving upon the conveyor 22 often in groups of several at a time, the bulbs 40 are dispersed along the length of the conveyor 22 in a generally single file, being moved along by the belt 82 and in contact with the inclined wall member 81. At the right end of the conveyor 22 the bulbs 40 slide down the ramp 134 to the bulb orienting conveyor 23 which carries the bulbs 40 to the left toward the elevator conveyor 24. On the orienting conveyor 23 the bulbs 40 are arranged vertically, their necks 42 dropping between the lower edges of the wall member 87 and the belt 88. At the left end of the orienting conveyor 23, the bulbs 40 are delivered to the elevator conveyor 24 which carries them by their necks 42 up an incline to the head of the chute 25. On the elevator conveyor 24 defective bulbs 40 without a cullet 43 are rejected by one of the alternative devices heretofore described and fall into the tray 175. The flow of bulbs 40 to the chute 25 is regulated by the starting and stopping of the preceding conveyors so that an adequate supply is maintained feeding by gravity to vacant slots 213 of the rotating turret 202. The chutes 28 each associated with a bulb loader turret 21, the eventual destination of the bulbs 40 in the present apparatus, receive their requirements of bulbs 40 from the turret 202. The transfer of the bulbs 40 from the turret 202 to the chutes 28 is regulated by sensing switches and effected by one of the mechanisms already described. From the chutes 28, the bulbs 40 load by gravity onto the turrets 21.

From the foregoing description of a preferred embodiment of our invention many variations will now be obvious to those of ordinary skill in the art. It is therefore not intended that our invention be limited to the particular arrangement of parts herein shown and described but rather to rely upon the definitions of our invention in terms of the appended claims.

What we claim is:

1. Apparatus for feeding open flared neck lamp bulbs having a closed bowl portion of greater diameter than said neck, said apparatus comprising a reservoir for said bulbs, an intermediate conveyor in bulb-receiving relationship with a discharge aperture of said reservoir, a bulb orienting conveyor disposed in bulb-receiving relationship with respect to said intermediate conveyor, a pair of inclined rails in bulb-receiving relationship with respect to said bulb orienting conveyor, and means for separating the number of said bulbs arriving at the lower end of said inclined rails into two separate required quantities, said separating means including a revolving turret having a plurality of bulb supporting positions, two additional pairs of parallel inclined rails, and movable guide means for transferring said bulbs from said positions on said turret to either of said pairs of inclined rails until a filled condition exists and then transferring the bulbs from said positions on said turret to the other of said additional pair of rails.

2. Conveyor apparatus for feeding open flared neck lamp bulbs having a bowl portion of greater diameter than said neck, to bulb loading devices, said apparatus comprising a reservoir for said bulbs; means for orienting said bulbs vertically in neck down position; means for transferring bulbs from said reservoir to said orienting means; a metering means for feeding required numbers of said bulbs to said loading devices; bulb elevator means for moving said bulbs from said orienting means to said metering means, said elevator means including a fixed inclined ramp member, and belt means disposed in parallel relationship with said ramp member for frictionally engaging the necks of said bulbs against said ramp member and urging said bulbs up said ramp; and means adjacent said elevator means for inspecting said bulbs, said inspection means including a nozzle positioned to direct a stream of compressed air to the under side of the bowl portion of said bulbs on said elevator means, said air exerting an upward force on said bulbs whereby bulbs without said flared neck are ejected from said elevator means.

References Cited in the file of this patent

UNITED STATES PATENTS 1,550,803    Harbison  ---------------  Aug. 25, 1925

(Other references on following page)

UNITED STATES PATENTS

| | | |
|---|---|---|
| 1,623,825 | Brown et al. | Apr. 5, 1927 |
| 1,989,898 | Trutner | Feb. 5, 1935 |
| 2,303,226 | Olson | Nov. 24, 1942 |
| 2,340,775 | Snyder | Feb. 1, 1944 |
| 2,417,878 | Luzietti et al. | Mar. 25, 1947 |
| 2,439,883 | Brown et al. | Apr. 20, 1948 |
| 2,546,866 | Overly | Mar. 27, 1951 |
| 2,743,001 | Nordquist | Apr. 24, 1956 |
| 2,696,909 | Strnad et al. | Dec. 14, 1954 |

FOREIGN PATENTS

| | | |
|---|---|---|
| 359,196 | Italy | May 16, 1938 |